United States Patent [19]
Kolb et al.

[11] 3,782,420
[45] Jan. 1, 1974

[54] CABLE INSTALLATION CONDUIT WITH L AND T JOINTS

[75] Inventors: Peter Kolb, Pirmasens; Gottfried Pollak, Waldfischbach-Burgalben; Rolf Sternjakob, Pirmasens, all of Germany

[73] Assignee: Firma Tehalit Kunststoffwerke GmbH, Heltersburg/Pfalz, Germany

[22] Filed: Apr. 14, 1972

[21] Appl. No.: 244,015

[30] Foreign Application Priority Data
Apr. 14, 1971 Germany.................. P 21 18 058.5

[52] U.S. Cl. ............................... 138/156, 138/157
[51] Int. Cl. ............................................... F16l 9/00
[58] Field of Search................... 138/156, 157, 162, 138/177; 52/220, 221, 588

[56] References Cited
UNITED STATES PATENTS

| | | | |
|---|---|---|---|
| 3,321,878 | 5/1967 | Brown et al. | 52/220 |
| 917,328 | 4/1909 | Lutz | 138/157 X |
| 686,052 | 11/1901 | Golding | 138/157 X |
| 3,351,699 | 11/1967 | Merckle | 138/157 X |

*Primary Examiner*—William T. Dixson, Jr.
*Assistant Examiner*—Steven M. Pollard
*Attorney*—Robert H. Jacob

[57] ABSTRACT

Cable conduit installation equipped with L-and T-connecting members which are provided with releasable means for sliding on and interengagement with the installation conduit and/or means for sliding on and underlapping or overlapping with the conduit covering.

3 Claims, 5 Drawing Figures

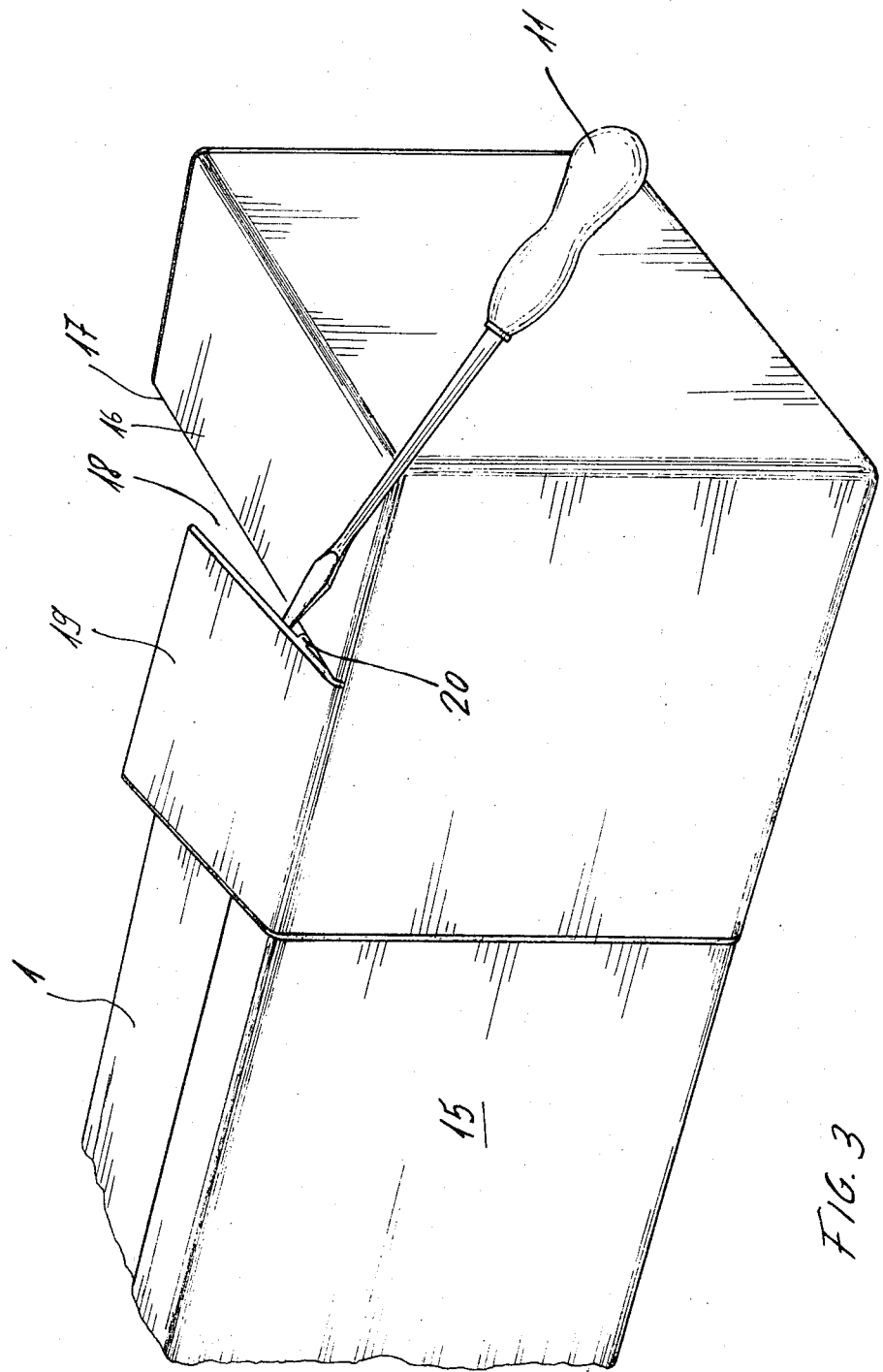

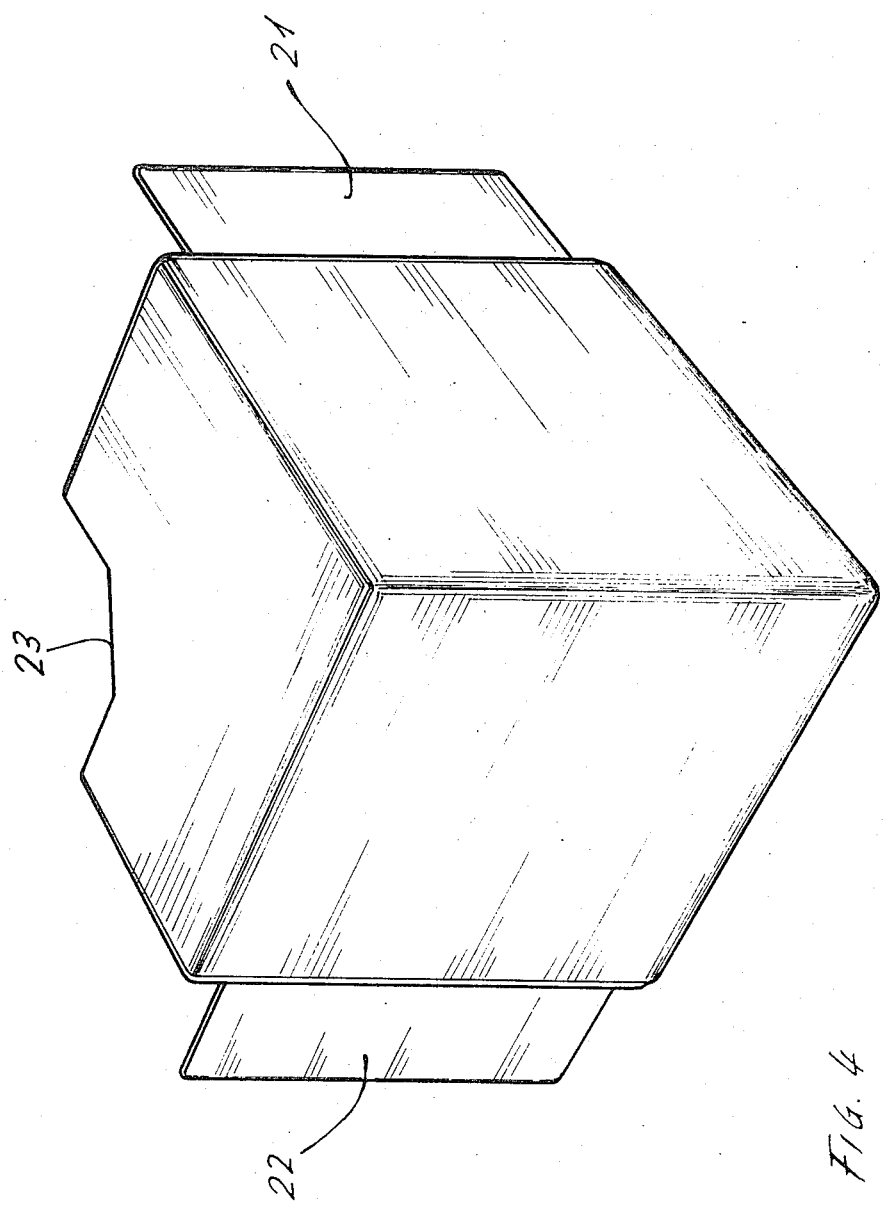

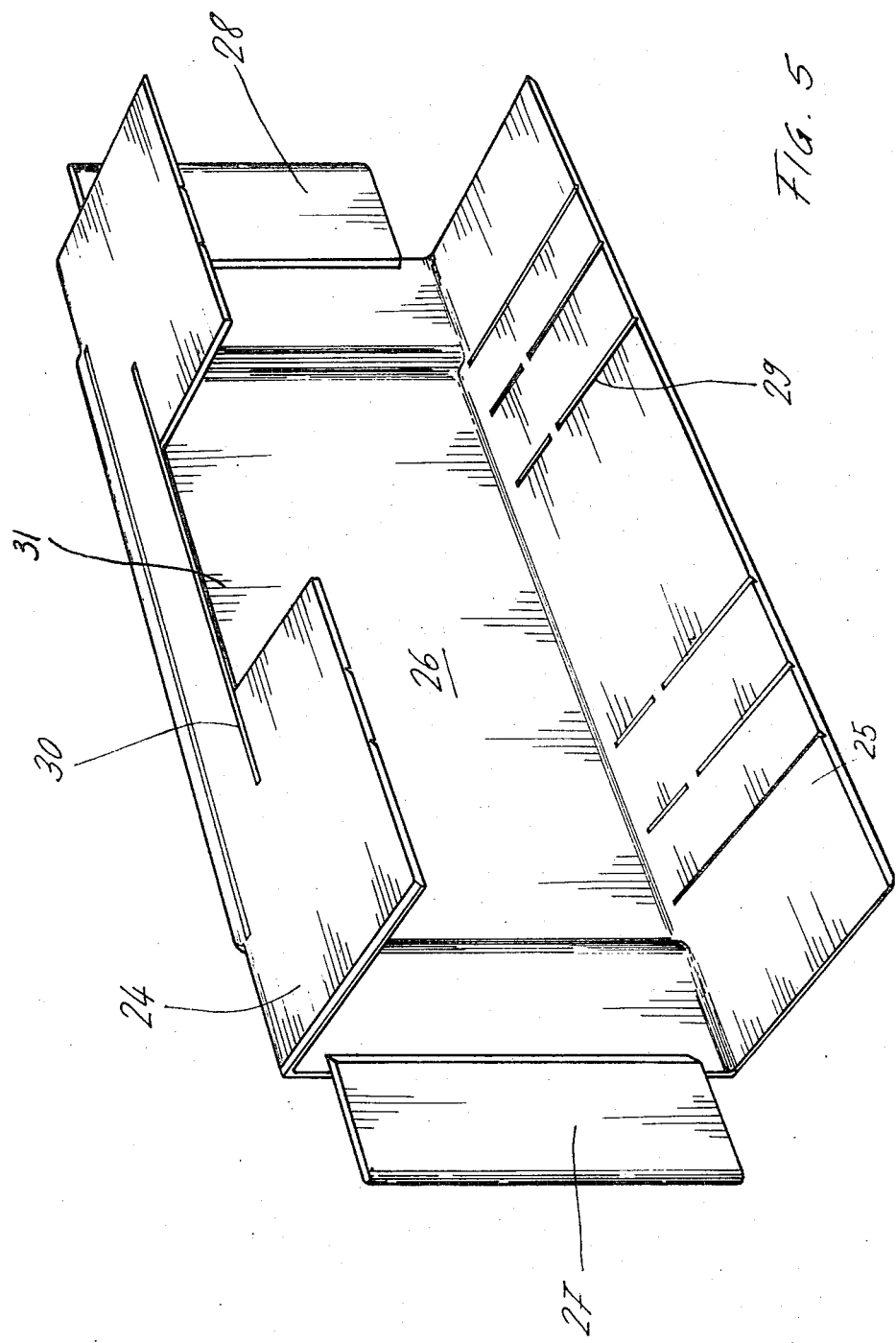

CABLE INSTALLATION CONDUIT WITH L AND T JOINTS

BACKGROUND OF THE INVENTION

The invention relates to cable installing conduits. More in particular the invention is concerned with a cable conduit, particularly the L-and T-connections thereof, where the L-connections serve essentially as corner connections or joints which involve an inner corner and an outer corner connection, while the T-connection serves as a rectangular connection of a conduit branch on a cable installation conduit.

Heretofore L-joints were made in a manner that the abutting ends of the conduits were mitered on and the front edges thus formed were joined together by gluing, welding or in a similar manner, which made it necessary to glue in or glue on specialcorner pieces, connecting tabs or the like, in order to increase the mechanical strength of the connection. It is obvious that connections of this kind are especially labor consuming at the location of installation, while the environmental conditions as a rule make the installation and assembly tasks even more difficult.

Accordingly the invention is concerned with the problem of equipping a cable conduit with connecting members in such a manner that the cables can be placed without any conditioning of the adjacent edges and the connection is produced by means of connecting elements that can be pressed on or slid on and also withdrawn in a simple manner.

SUMMARY OF THE INVENTION

In accordance with the invention the problem is solved by a cable installation conduit having L-and T-connecting members which are equipped with releasable means for sliding on and engagement with the conduit strip and/or means for sliding on and staggering by means of the conduit strip covering.

The L-connecting members to be considered as the inner corners or edges may be equipped, for example, with catches which can be reached under with a simple tool such as a screw driver which engage outer grooves provided in the strips for securing the covering as the conduit strips are slid on. It is also possible, however, to equip the wall portions of the L-connecting members that extend in the direction of the conduit covering with extensions that reach under the covering.

The same applies also to the L-connecting members that form the outer corners. Here either a part of the side wall separated from the remaining connecting member by a transverse slot may be provided with a bulge for engagement with the groove of the side wall of the conduit, but it is also possible to arrange the corresponding extensions for reaching underneath the conduit covers.

It is also possible to provide both kinds of connections simultaneously.

The L-connecting members may be provided at their inner side with an inclined or oblique wall portion in the immediate corner area in order to facilitate the placing of the cables around the corner.

Preferably the T-connecting member is likewise provided with extensions which reach below the covers of the conduit strips. Furthermore, it may be provided with prefabricated grooves suitably on the inside of its side walls for readily breaking out connecting openings of different sizes.

All connecting members have side walls which cover the side walls of the cable conduit up to its rear or mounting wall. They practically constitute hoods that completely cover the entire area of the abutment of two cable conduit strips.

BRIEF DESCRIPTION OF THE DRAWINGS

Further features of the invention and details about the advantages obtained thereby will become apparent from the following description of the embodiments of the individual connecting members illustrated in the accompanying drawings in which FIG. 3 shows an L-connecting member, FIG. 4 is a further modification of an outer corner, and FIG. 5 shows a T-connecting element.

DESCRIPTION OF THE INVENTION

Figure 1:
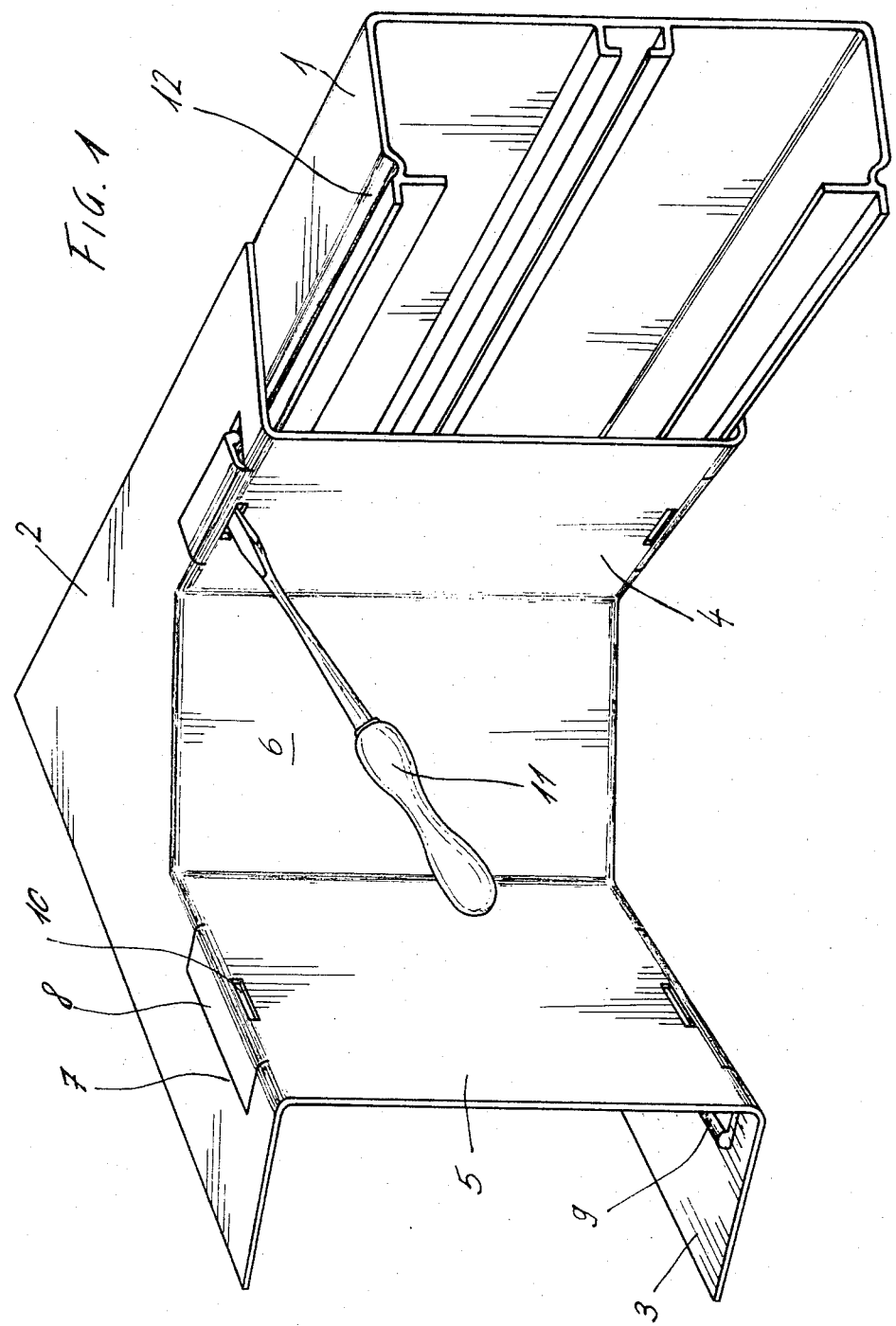
FIG. 1 is an L-connecting member defining an inner corner with a cable conduit connected to one side.
Figure 2:
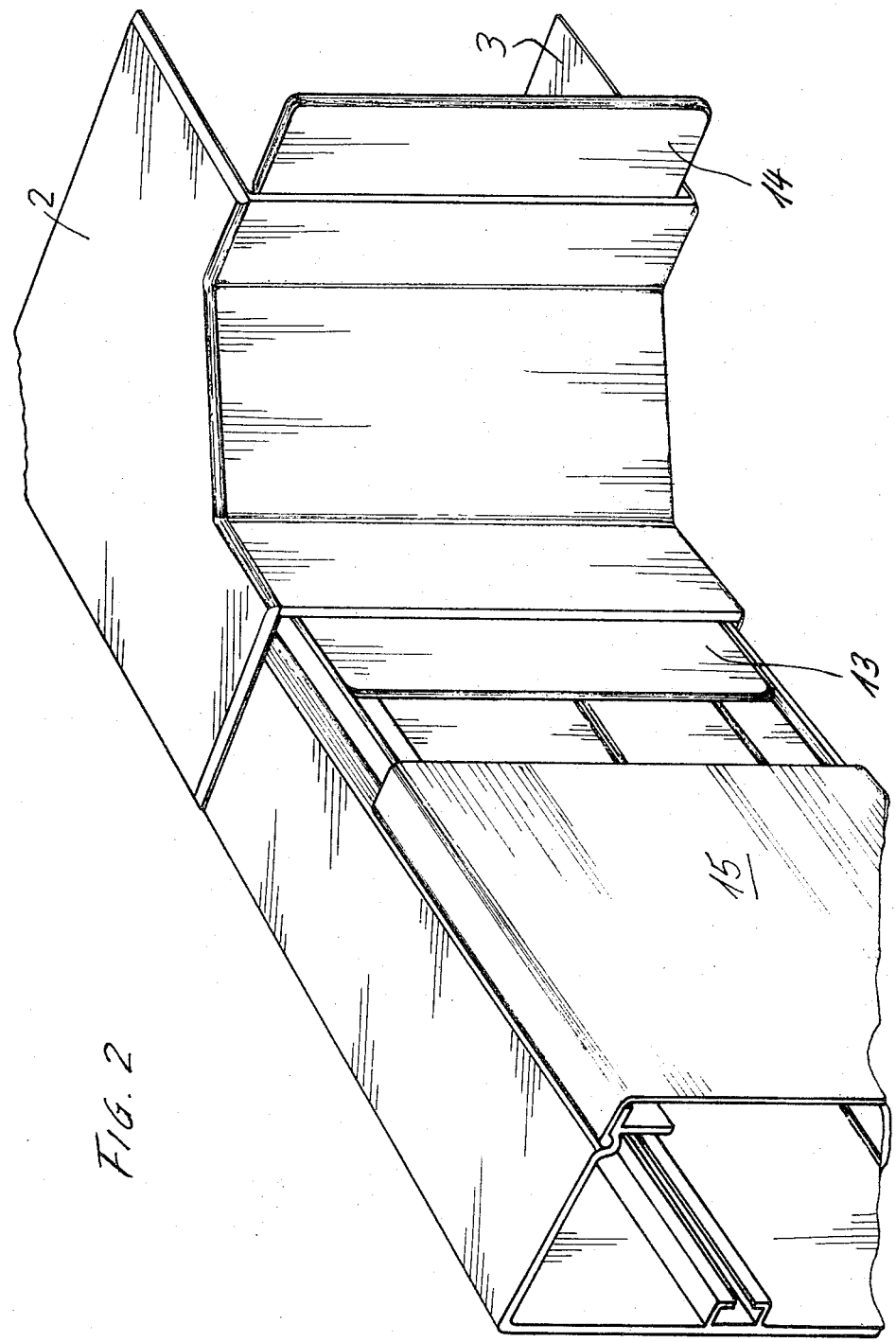
FIG. 2 shows a modified embodiment of such an inner corner.

A cable conduit 1 of rectangular cross section which is of any desired construction is to be continued at a right angle in the corner of a room. The continuation is not shown in FIG. 1. In order to simplify or make possible the transition from one conduit strip to the other, the invention provides for an L-connecting member comprising two side walls 2 and 3 and cover plates 4 and 5 connecting these side walls. In order to facilitate the placing of the cables, the corner area 6 between the cover plates 4 and 5 may be slanted as illustrated in FIG. 1. This L-connecting element can be slid in simple fashion on the two cable conduits that abut one another at a right angle.

In order to secure the L-connecting element in place it may be provided with a resilient member 8 that is separated by a slot 7 from the other area of the side walls 2 and which is provided with an inwardly extending bulge 9.

As the L-connecting member is slid in place the bulges 9 of members 8 snap into the elongated grooves 12 that exist in the side walls of the cable conduits 1 at any rate for applying their covering, so that the connecting member is secured in its final position. If it is to be released it is only necessary to slide a screwdriver through the slot 10 and press up member 8 until the groove 12 releases the bulge 9.

Such members 8 are preferably provided on both side walls 2 and 3, so that it is not necessary during mounting to maintain a specific position. In lieu of the resilient members that cooperate with the grooves in the side walls of the cable conduits 1, the L-connecting member can be equipped with extensions 13, 14 that extend in the direction of the conduit coverings 15 and reach below them. This form of construction of the L-connecting member is thus determined only upon application of the covering of the conduit in its final position. On the other hand, the production of this L-connecting member is simpler.

For the construction of outside corners, again an L-connecting member having two side walls 16 may be provided, where the side walls 16 are provided in a continuation of the one inner edge 17 with a slot 18 that severs a part 19 from the side wall 16 which may also be raised by using a simple tool such as a screw driver 11, so that a bulge 20 on the inside of this part 19 which engages and interlocks with the groove 12 of the side wall of the conduit 1, is lifted out of this groove.

The positioning or placing takes place in a simple manner. The bulge 20 interengages automatically with the groove 12. For removing the connecting member merely the use of a screw driver is required.

Also in this connection a modified embodiment with extensions or projections 21 and 22 is possible which are again slid under the cable conduit cover 15 or are covered thereby. In this manner the L-connecting member is secured in position. Also these L-connecting members that serve as outside corners may be formed with a slanted wall 23 in the immediate area of the inner corner. In that case the masonry has to be broken away at the corner around which the cable conduit extends. This can be tolerated, however, in order to make possible better conducting of the cables around the corner.

Finally, in order to make possible the connection of a cable conduit at a right angle to another cable conduit in any desired position, a T-connecting member is provided which consists essentially of two side walls 24, 25, as well as a wall 26 connecting these side walls, which is located in the plane of the conduit cover 15. This wall 26 is provided with extensions 27 and 28 which again are retained by the covering 15.

The side walls 24 and 25 may be provided with grooves 29, 30 arranged in any manner desired that constitute locations for breaks to be made, for example for forming a recess 31 to which the branch conduit is connected. Depending on the magnitude of the cross-section of this conduit an area 31 that is larger or smaller depending on the break positions or grooves that are provided is broken away.

All connecting members are so formed, as reflected by the different embodiments, that their side walls have free edges that reach to the corners between the side and rear walls of the cable conduits. Thus they cover the entire overlap area between two cable conduit strips.

Having now described our invention with reference to the embodiments disclosed, what we desire to cover by letters patent is set forth in the appended claims.

We claim:

1. Cable conduit installation comprising a cable conduit presenting upper and lower walls, at least one said wall having a latch engagement configuration, a connecting member intermediate said upper and lower walls, said connecting member being a cover plate closing the open space between said upper and lower walls and having portions extending over said upper and lower walls, at least one said portion having a latch member slidable into engagement with said latch engagement configuration, said upper and lower walls presenting grooves defining said latch engagement configuration, a side wall of an L-connecting member that serves as a connecting member for an outer corner is provided with a slot prolonging one inner edge of said side wall and forms a well portion that is separated from the remaining wall portion and is provided with a bulge adapted to engage one said groove.

2. Cable conduit installation in accordance with claim 1, where one wall of the connecting member is provided with a plurality of break-out locations defined by grooves extending at right angles relative to one another.

3. Cable conduit installation in accordance with claim 2, where said connecting member has side walls that completely cover the side walls of the cable conduit walls up to the ends thereof at the back wall of said cable conduits.

* * * * *